(12) United States Patent
Perry et al.

(10) Patent No.: US 11,400,411 B2
(45) Date of Patent: Aug. 2, 2022

(54) ABSORBENT COMPOSITIONS INCLUDING AMINO-SILOXANES

(71) Applicant: GE Oil & Gas, Inc., Houston, TX (US)

(72) Inventors: Robert James Perry, Niskayuna, NY (US); Matthew Paul Rainka, Niskayuna, NY (US)

(73) Assignee: Baker Hughes Energy Services LLC, Houston, TX (US)

( * ) Notice: Subject to any disclaimer, the term of this patent is extended or adjusted under 35 U.S.C. 154(b) by 230 days.

(21) Appl. No.: 16/499,612

(22) PCT Filed: Apr. 6, 2017

(86) PCT No.: PCT/US2017/026289
§ 371 (c)(1),
(2) Date: Sep. 30, 2019

(87) PCT Pub. No.: WO2018/186860
PCT Pub. Date: Oct. 11, 2018

(65) Prior Publication Data
US 2020/0108343 A1 Apr. 9, 2020

(51) Int. Cl.
*B01D 53/14* (2006.01)
*B01D 53/62* (2006.01)
*B01D 53/78* (2006.01)

(52) U.S. Cl.
CPC ..... *B01D 53/1493* (2013.01); *B01D 53/1475* (2013.01); *B01D 53/62* (2013.01);
(Continued)

(58) Field of Classification Search
CPC ............ B01D 53/1493; B01D 53/1475; B01D 53/62; B01D 53/78; B01D 2252/2041;
(Continued)

(56) References Cited

U.S. PATENT DOCUMENTS

| | | | | |
|---|---|---|---|---|
| 3,274,155 A | * | 9/1966 | Caldwell | C08G 77/00 528/26 |
| 2010/0113711 A1 | * | 5/2010 | Ward | C08G 18/12 525/420 |
| 2014/0141025 A1 | * | 5/2014 | Kudirka | A61K 47/6851 424/181.1 |

OTHER PUBLICATIONS

M.G. Voronkov, "Hydrosilylation of unsaturated amines with oligodimethylsiloxanes containing terminal Si-H bonds and physicochemical properties of the products", Khimicheskaya Promyshlennost (Moscow), 1996, issue 1, pp. 7-8. (Year: 1996).*

* cited by examiner

*Primary Examiner* — Anita Nassiri-Motlagh
(74) *Attorney, Agent, or Firm* — Baker Hughes Patent Organization

(57) ABSTRACT

An absorbent composition includes an amino-siloxane having structure (I): wherein $R^1$ is independently at each occurrence a $C_1$-$C_6$ aliphatic or aromatic radical; $R^2$ is independently at each occurrence a $C_2$-$C_{10}$ aliphatic or aromatic radical; $R^3$ is independently at each occurrence a hydrogen atom or a $C_1$-$C_6$ aliphatic or aromatic radical; $R^4$ is independently at each occurrence a $C_1$-$C_{18}$ aliphatic or aromatic radical or $R^5$, wherein $R^5$ comprises structure (II): wherein X is independently at each occurrence an oxygen atom or a sulfur atom; w is between 0 and 5; y is between 0 and 10;
(Continued)

and z is between 0 and 10; wherein, when $R^4$ is $R^5$ comprising the structure (II), a sum of w, y, and z is greater than or equal to 0, and, when $R^4$ is not $R^5$, a sum of w, y, and z is greater than or equal to 1.
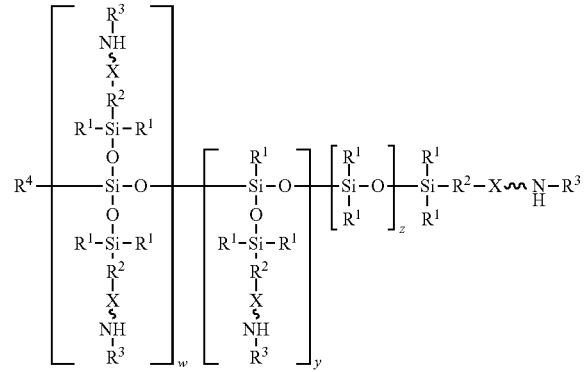
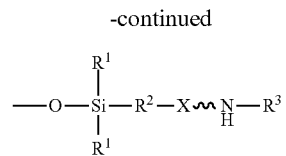
9 Claims, 3 Drawing Sheets
(52) U.S. Cl.
CPC ...... *B01D 53/78* (2013.01); *B01D 2252/2041* (2013.01); *B01D 2252/20415* (2013.01); *B01D 2252/20421* (2013.01); *B01D 2252/20426* (2013.01); *B01D 2257/504* (2013.01); *B01D 2258/0283* (2013.01)
(58) Field of Classification Search
CPC ........... B01D 2252/20415; B01D 2252/20421; B01D 2252/20426; B01D 2257/504; B01D 2258/0283
USPC ........................................................ 423/228
See application file for complete search history.

| CLASSIFICATION | ENTRY | COMPOUND | $CO_2$ UPTAKE | PHYSICAL STATE |
|---|---|---|---|---|
| LINEAR WORKING EXAMPLE WITH PRIMARY AMINE TERMINI | A | $H_2N\sim\sim O\sim\sim$ Si-O-Si-O-Si $\sim\sim O\sim\sim NH_2$ (Me groups on Si) | 87 | THICK, FLOWABLE LIQUID |
| LINEAR WORKING EXAMPLE WITH METHYLAMINE TERMINI | B | $MeHN\sim\sim O\sim\sim$ Si-O-Si-O-Si $\sim\sim O\sim\sim NHMe$ (Me groups on Si) | 101 | LOW VISCOSITY, FLOWABLE LIQUID |
| LINEAR WORKING EXAMPLE WITH ETHYLAMINE TERMINI | C | $EtHN\sim\sim O\sim\sim$ Si-O-Si-O-Si $\sim\sim O\sim\sim NHEt$ (Me groups on Si) | 113 | LOW VISCOSITY, FLOWABLE LIQUID |
| LINEAR WORKING EXAMPLE WITH BUTYLAMINE TERMINI | D | $BuHN\sim\sim O\sim\sim$ Si-O-Si-O-Si $\sim\sim O\sim\sim NHBu$ (Me groups on Si) | 103 | LOW VISCOSITY, FLOWABLE LIQUID |

FIG. 2A

| | | | |
|---|---|---|---|
| BRANCHED WORKING EXAMPLE WITH BUTYLAMINE TERMINI | E | BuHN~O~~Me-Si-O-Si-O-Si-O-Si~O~NHBu (branched structure with Me groups and NHBu termini) | 80 | THICK, FLOWABLE LIQUID |
| LINEAR CONTROL EXAMPLE WITH ETHYLAMINE TERMINI | F | EtHN~~~Me-Si-O-Si-O-Si~~~NHEt | 108 | THICK PASTE |
| LINEAR CONTROL EXAMPLE WITH BUTYLAMINE TERMINI | G | BuHN~~~Me-Si-O-Si-O-Si~~~HNBu | 115 | THICK, FLOWABLE LIQUID |

FIG. 2B

ABSORBENT COMPOSITIONS INCLUDING AMINO-SILOXANES

BACKGROUND

Power generating processes that are based on combustion of carbon-containing fuel typically produce carbon dioxide ($CO_2$) and other exhaust gases as byproducts. The exhaust gases may be harmful to the environment, such as by contributing to the greenhouse effect and global warming. It may be desirable to capture or otherwise separate the $CO_2$ from the gas stream exhausted to the environment to reduce the $CO_2$ emissions and/or to utilize $CO_2$ in the power generation process or in other processes.

Conventional absorbent solvents used to capture a target gas, such as $CO_2$ or other exhaust gases, experience increased viscosity when exposed to the target gas. The increased viscosity of the solvent has several disadvantages. For example, the absorbent solvents may form solids or very high viscosity oils upon reacting with $CO_2$. The increased viscosity reduces the mass transfer of $CO_2$ into the solvent, such that the absorbent solvent reacts with less $CO_2$ than is theoretically possible. Furthermore, materials that form solid $CO_2$ reaction products may not readily fit into existing $CO_2$ capture process schemes which are designed for flowable liquids.

In order to avoid the issues associated with the increased viscosity of the absorbent solvent upon reaction, some conventional absorbent solvents dilute the concentration of the absorbent composition in the solvent using a carrier fluid, such as water. Although using a carrier fluid can reduce the viscosity of the reaction product, the reduced concentration of the absorbent composition also reduces the performance of the absorbent solvent by decreasing the amount of $CO_2$ that can be absorbed, referred to herein as $CO_2$ uptake. Moreover, the use of the carrier fluid also increases the energy consumption of the process relative to not using the carrier fluid, due to the energy required for heating and evaporation of the carrier fluid.

BRIEF DESCRIPTION

In an embodiment, an absorbent composition is provided that includes an amino-siloxane having structure (I):

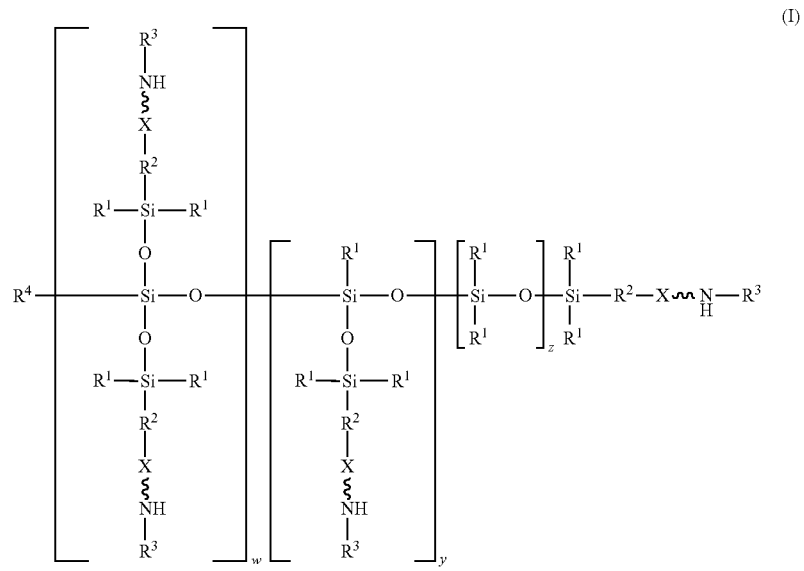

wherein $R^1$ is independently at each occurrence a $C_1$-$C_6$ aliphatic or aromatic radical; $R^2$ is independently at each occurrence a $C_2$-$C_{10}$ aliphatic or aromatic radical; $R^3$ is independently at each occurrence a hydrogen atom or a $C_1$-$C_6$ aliphatic or aromatic radical; $R^4$ is independently at each occurrence a $C_1$-$C_{18}$ aliphatic or aromatic radical or $R^5$, wherein $R^5$ comprises structure (II):

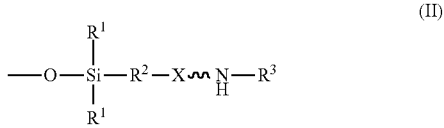

wherein X is independently at each occurrence an oxygen atom or a sulfur atom; w is between 0 and 5; y is between 0 and 10; and z is between 0 and 10; wherein, when $R^4$ is $R^5$ comprising the structure (II), a sum of w, y, and z is greater than or equal to 0, and, when $R^4$ is not $R^5$, a sum of w, y, and z is greater than or equal to 1.

In another embodiment, an absorbent composition is provided that includes an amino-siloxane having structure (III):

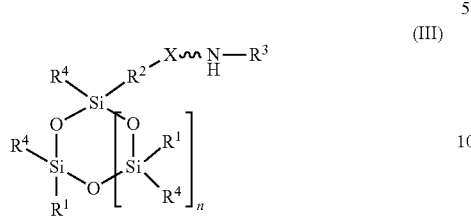

(III)

wherein $R^1$ is independently at each occurrence a $C_1$-$C_6$ aliphatic or aromatic radical; $R^2$ is independently at each occurrence a $C_2$-$C_{10}$ aliphatic or aromatic radical; $R^3$ is independently at each occurrence a hydrogen atom or a $C_1$-$C_6$ aliphatic or aromatic radical; $R^4$ is independently at each occurrence a $C_1$-$C_{18}$ aliphatic or aromatic radical or $R^5$, wherein $R^5$ comprises structure (IV):

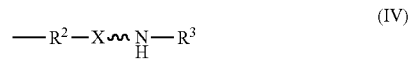

(IV)

wherein X is independently at each occurrence an oxygen atom or a sulfur atom; and n is between 1 and 6, such that the structure (III) includes a ring-shaped core comprising between three and eight alternating pairs of silicon and oxygen atoms.

In an embodiment, a method of reducing an amount of target gas in a process stream is provided that includes contacting the process stream containing the target gas with an absorbent composition comprising an amino-siloxane having structure (I):

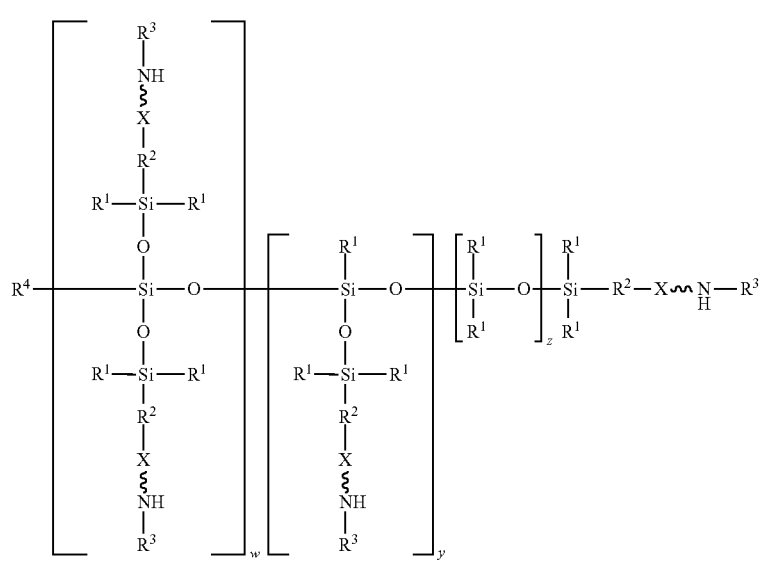

(I)

wherein $R^1$ is independently at each occurrence a $C_1$-$C_6$ aliphatic or aromatic radical; $R^2$ is independently at each occurrence a $C_2$-$C_{10}$ aliphatic or aromatic radical; $R^3$ is independently at each occurrence a hydrogen atom or a $C_1$-$C_6$ aliphatic or aromatic radical; $R^4$ is independently at each occurrence a $C_1$-$C_{18}$ aliphatic or aromatic radical or $R^5$, wherein $R^5$ comprises structure (II):

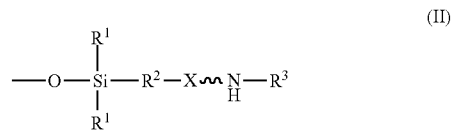

(II)

wherein X is independently at each occurrence an oxygen atom or a sulfur atom; w is between 0 and 5; y is between 0 and 10; and z is between 0 and 10; wherein, when $R^4$ is $R^5$ comprising the structure (II), a sum of w, y, and z is greater than or equal to 0, and, when $R^4$ is not $R^5$, a sum of w, y, and z is greater than or equal to 1.

BRIEF DESCRIPTION OF THE DRAWINGS

FIGS. 2A and 2B show a table of $CO_2$ capture data relating to five working example absorbent compositions and two control example absorbent compositions.

DETAILED DESCRIPTION

Figure 1:
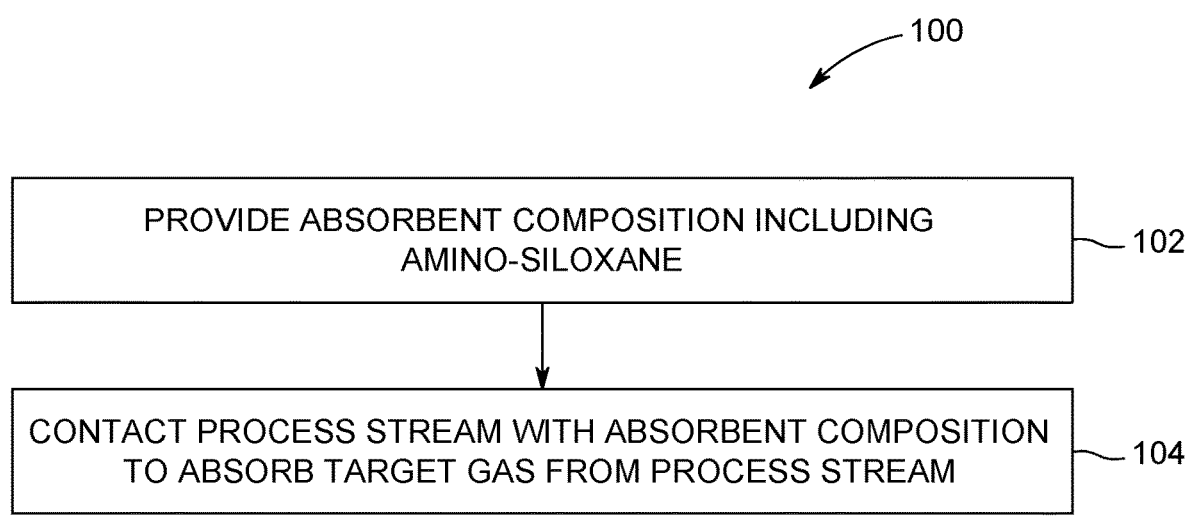
FIG. 1 is a flow chart of a method for reducing an amount of a target gas in a process stream using an absorbent composition according to an embodiment.

One or more embodiments of the inventive subject matter described herein provide absorbent compositions or solvents. The absorbent compositions include amino-siloxanes that have a primary or secondary amine group on a terminus of the molecule. The amine group on the terminus is separated from a heteroatom, such as an oxygen atom or a sulfur atom, by an ethyl linkage. Also described are methods of using these absorbent compositions as gas absorbents to capture target gases, such as $CO_2$, from process gas streams. More particularly, the absorbent compositions described herein are configured to provide effective $CO_2$ capture and to remain in a flowable, liquid phase after absorbing $CO_2$. Due to the low viscosity reaction product, one or more of the absorbent compositions described herein are substantially free of a carrier fluid with the amino-siloxane because a carrier fluid is not required to provide a flowable reaction product.

The amino-siloxanes in the absorbent compositions described herein have various different core architectures or structures, including linear core structures, branched core structures, and cyclic core structures. The different amino-siloxanes were synthesized to contain various functional amine groups at the termini of the molecules, as well as different heteroatoms that are spaced apart from the functional amine groups by the ethyl linkages. When the amino-siloxanes contact a target gas, such as $CO_2$, in a process stream, the functional amine groups are configured to react with and bond to the target gas molecules to capture (e.g., absorb) the target gas from the process stream. The amino-siloxanes described herein include at least one functional arm or branch that extends outward from the siloxane core of the molecule. Each functional arm includes a respective heteroatom linked to a respective primary or secondary functional amine group by an ethyl linkage. Some of the amino-siloxanes may have a single functional arm, while other amino-siloxanes described herein are bi-functional, tri-functional, tetra-functional, or the like. For example, a tetra-functional amino-siloxane includes four functional arms that each can participate in the capture of the target gas. The functional arms also include an alkyl spacer between the core of the molecule and the heteroatom of the functional arm.

As used herein, an element or step recited in the singular and proceeded with the word "a" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Approximating language, as used herein, may be applied to modify any quantitative representation that could permissibly vary without resulting in a change in the basic function to which it is related. Accordingly, a value modified by a term such as "about" or "substantially" is not limited to the precise value specified. In some instances, the approximating language may correspond to the precision of an instrument for measuring the value. Furthermore, a value modified by a term such as "about" or "substantially" may be inclusive of a threshold range of values around the specified value, such as values within 10%, 5%, or 1% of the specified value. For example, a phrase that an absorbent composition is "substantially free of a carrier fluid" may refer to absorbent compositions without any carrier fluid and also to absorbent compositions that do include a carrier fluid within the designated threshold range. Therefore, if the threshold range is 15%, then an absorbent composition that is "substantially free of a carrier fluid" may refer to an absorbent composition that has up to 15% by mass or volume of a carrier fluid, but does not include an absorbent composition having greater than 15% of a carrier fluid.

As used herein, the term "aliphatic radical" refers to an organic radical having a valence of at least one consisting of a linear or branched array of carbon and hydrogen atoms, which is not cyclic. The aliphatic radicals include fully saturated hydrocarbon molecules (e.g., alkanes) and unsaturated hydrocarbon molecules (e.g., alkenes or alkynes). By way of example, a $C_1$-$C_5$ aliphatic radical contains at least one but no more than five carbon atoms. For example, a methyl group (i.e., $CH_3$—) is a $C_1$ aliphatic radical, an ethyl group (i.e., $CH_3CH_2$—) is a $C_2$ aliphatic radical, a propyl group (i.e., $CH_3(CH_2)_2$—) is a $C_3$ aliphatic radical, and a butyl group (i.e., $CH_3(CH_2)_3$—) is a $C_4$ aliphatic radical. As used herein, the term "aromatic radical" refers to a cyclic hydrocarbon molecule with at least one double bond. For example, phenyl is a $C_6$ aromatic molecule. As used herein, a "heterocyclic" compound or group refers to a cyclic compound that has atoms of at least two different elements as members of the ring or rings of the compound. For example, piperidine and pyridine are two examples of heterocyclic compounds.

In one embodiment, an absorbent composition is provided that includes an amino-siloxane that has structure (I):

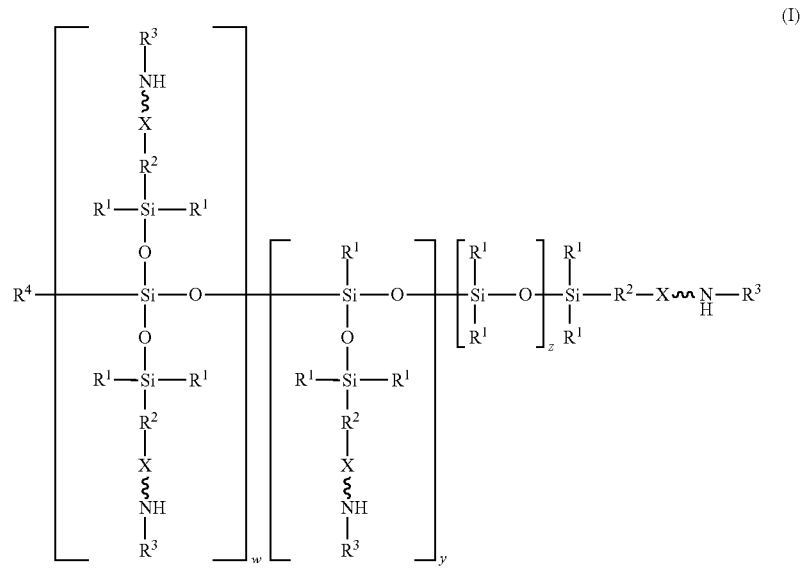

wherein $R^1$ is independently at each occurrence a $C_1$-$C_6$ aliphatic or aromatic radical; $R^2$ is independently at each occurrence a $C_2$-$C_{10}$ aliphatic or aromatic radical; $R^3$ is independently at each occurrence a hydrogen atom or a $C_1$-$C_6$ aliphatic or aromatic radical; $R^4$ is independently at each occurrence a $C_1$-$C_{18}$ aliphatic or aromatic radical or $R^5$, wherein $R^5$ comprises structure (II):

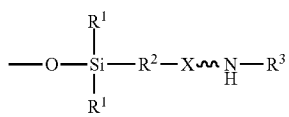
(II)

wherein X is independently at each occurrence an oxygen atom or a sulfur atom; w is between 0 and 5; y is between 0 and 10; and z is between 0 and 10; wherein, when $R^4$ is $R^5$ comprising the structure (II), a sum of w, y, and z is greater than or equal to 0, and, when $R^4$ is not $R^5$, a sum of w, y, and z is greater than or equal to 1.

The amino-siloxane has at least one functional arm that includes a primary or secondary amine at the terminus connected to a heteroatom of either oxygen or sulfur via an ethyl linkage. For example, when $R^3$ is a hydrogen atom, the amine is a primary amine (e.g., —$NH_2$). Alternatively, the amine is a secondary amine when $R^3$ is a $C_1$-$C_6$ aliphatic or aromatic radical. For example, the secondary amine group may be a methylamine group (e.g., —$NHCH_3$) or an ethylamine group (e.g., —$NHC_2H_5$). The $C_1$-$C_6$ aliphatic or aromatic radical of $R^3$ that is bonded to the nitrogen atom can be linear, branched, or cyclic. For example, the —$NHR^3$ group may be a heterocyclic compound, such as piperidine, pyridine, or the like. In another example, when $R^3$ is a $C_4$ aliphatic radical, the radical may be in a linear butyl form or a branched isobutyl form.

As stated above, the spacer $R^2$ between the silicon and the heteroatom is a $C_2$-$C_{10}$ aliphatic or aromatic radical. For example, $R^2$ may be a $C_3$ aliphatic radical that is either in the linear propyl form or the branched isopropyl form. Some amino-siloxanes described herein may be present in an absorbent composition in ratio of multiple isomeric states. For example, a certain amino-siloxane with a propyl spacer at spacer at $R^2$ may include 60% γ-isomer in which the spacer is in the linear form and 40% β-isomer in which the spacer is in the branched form. In other embodiments, the spacer $R^2$ may include a cyclic hydrocarbon, such as benzene or the like. Therefore, the spacer $R^2$ may be linear, branched, or cyclic and contain between two and ten carbon atoms.

The structure (I) has a siloxane core structure. The siloxane core structure can include a linear and/or branched chain of siloxy units. The amino-siloxane structure (I) includes a double-branching repeat unit at w, a single-branching repeat unit at y, and a siloxy repeat unit (that lacks branching functional arms) at z. It is recognized that the amino-siloxane of structure (I) can have both a branched core structure (e.g., w and/or y is at least 1) and an extended linear core structure (e.g., z is at least 1). The amino-siloxane includes at least one of the repeat units because the sum of w, y, and z is at least 1 (unless $R^4$ is $R^5$ comprising the structure (II), as described below). For example, when w and y are both 0 and z is at least 1, then the amino-siloxane has an extended linear core structure (without branching). In another example, when w or y is at least 1, then the amino-siloxane has a branched core structure. For example, if w is 1 and y is 0, then the amino-siloxane can be tri-functional or tetra-functional, depending on whether or not $R^4$ comprises structure (II) of $R^5$. When $R^4$ is $R^5$ and comprises structure (II), w is 1, and y is 0, the amino-siloxane is tetra-functional, such that four functional arms branch from the core structure. The siloxane core structure of this tetra-functional molecule may be described as being star-shaped or diamond-shaped, such that a central silicon atom is bonded to four siloxane branches. When $R^3$ is an aliphatic or aromatic radical, such as a phenyl group, w is 1, and y is 0, the amino-siloxane is tri-functional. The multiple siloxane branches may be identical to one another, but alternatively may differ from one another. For example, one or more of the siloxane branches may include different amine groups at the termini of the branches. When w is 0 and y is 1, the amino-siloxane can be bifunctional or tri-functional, depending on whether or not $R^4$ is $R^5$. When $R^4$ is $R^5$ and comprises structure (II), the amino-siloxane is tri-functional, with three amine functional arms branching from the core structure. The amino-siloxane is bifunctional when $R^4$ is either an aliphatic radical or an aromatic radical, such as a phenyl group. In another embodiment, the amino-siloxane of structure (I) has only one functional arm when $R^4$ is a hydrocarbon (e.g., is not $R^5$), and both w and y are 0.

In an embodiment, when $R^4$ is $R^5$ such that $R^4$ comprises structure (II), the sum of w, y, and z is greater than or equal to 0. Therefore, if the sum is 0, then amino-siloxane includes none of the repeating units, and the molecular structure is bifunctional with two functional arms extending from a single siloxane group (e.g., Si—O—Si) at the core. Therefore, the various embodiments of the amino-siloxane of structure (I) always include at least one siloxane group, and may include multiple siloxane groups. For example, if z is at least 1, then the core includes a linear chain of multiple siloxane groups.

In an embodiment, the amino-siloxane of structure (I) is bifunctional because $R^4$ is $R^5$, having the structure (II), and both w and y are 0. The amino-siloxane is linear with two functional arms branching in opposite directions from the siloxane core, as shown in structure (Ia):

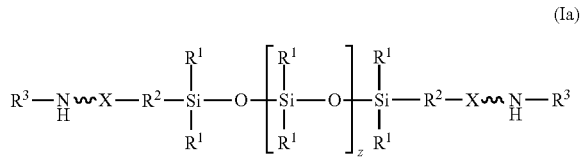
(Ia)

Although the siloxy repeat unit is shown in structure (Ia), it is recognized that z may be 0 such that the repeat unit may not be present in the molecule. The two functional groups in the structure (Ia) may be identical to one another, but alternatively may differ from one another. For example, the functional amine groups at the termini may include different elements or groups bonded to the nitrogen atom.

In one embodiment of the structure (I), the heteroatom X at each occurrence is an oxygen atom and $R^3$ at each occurrence is a methyl aliphatic radical, as shown in structure (Ie):

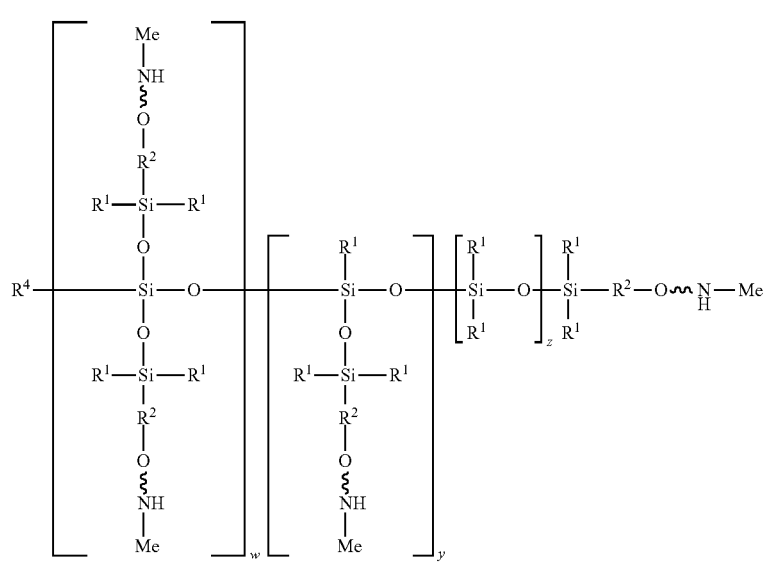

(Ie)

In the illustrated embodiment, $R^4$ is independently at each occurrence a $C_1$-$C_{18}$ aliphatic or aromatic radical or $R^5$, wherein $R^5$ comprises structure (IIa):

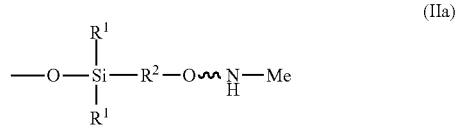

(IIa)

In an alternative embodiment, the heteroatom X may be a sulfur atom and/or $R^3$ may be a hydrogen atom or a hydrocarbon other than a methyl group.

Optionally, the amino-siloxane of structure (I) has a branched core structure. For example, at least one of w or y is greater than or equal to 1, such that one or more functional arms branch out vertically from the core structure. In one embodiment, w is 1, and both y and z are 0, such that the amino-siloxane is branched with at least three functional arms extending from a central silicon atom. For example, the amino-siloxane may have structure (Ib):

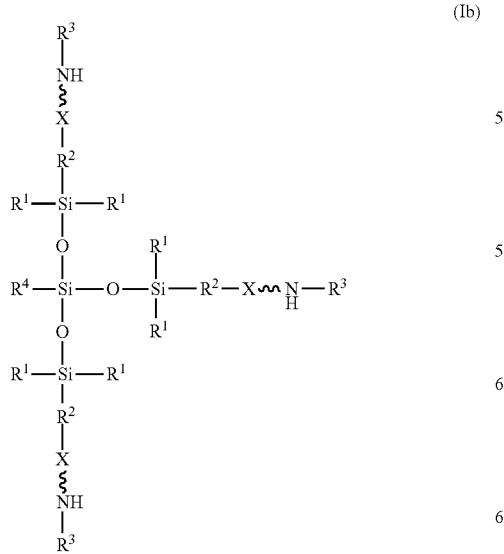

(Ib)

The amino-siloxane of structure (Ib) may be tri-functional or tetra-functional, depending on whether or not $R^4$ has a functional arm (e.g., includes the structure (II) of $R^5$). For example, when $R^4$ is $R^5$, the amino-siloxane is tetra-functional with four functional arms branching from the core structure. The tetra-functional form of the structure (Ib) is shown in structure (Ic):

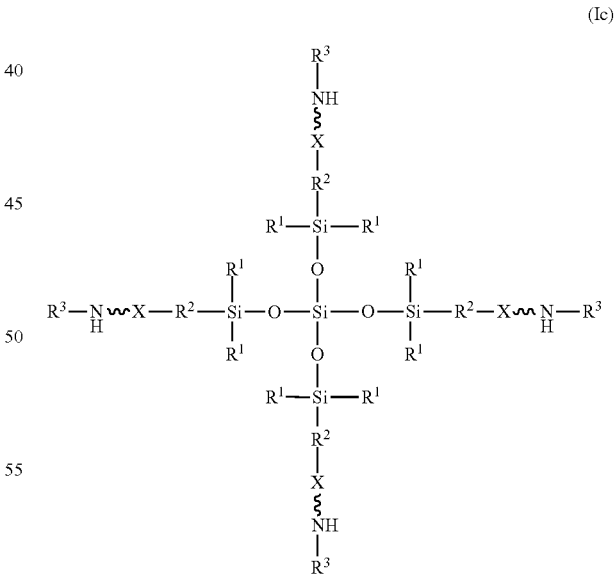

(Ic)

As shown, the siloxane core structure is star-shaped or diamond-shaped, such that a central silicon atom is bonded to four siloxane groups. Each of the siloxane groups are disposed between the central silicon atom and a corresponding amine functional arm. The multiple amine functional arms may be identical to one another, but alternatively may differ from one another.

In another example, the amino-siloxane of structure (Ib) is tri-functional when $R^4$ is a $C_1$-$C_{18}$ aliphatic or aromatic radical, such as a methyl group, a phenyl group, or the like. One embodiment of the tri-functional form of structure (Ib) is shown in structure (Id):

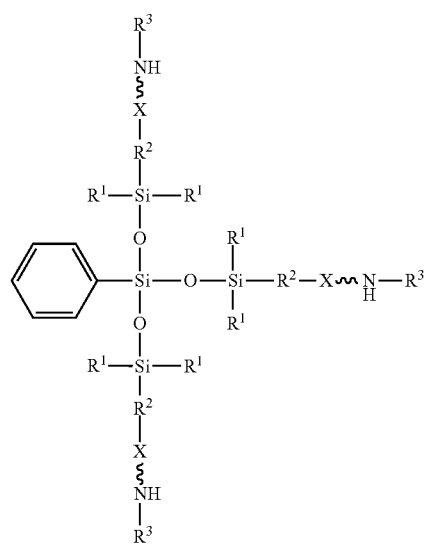

(Id)

In the illustrated embodiment, $R^4$ is a phenyl group. The central silicon atom is bonded to three siloxane groups.

In another embodiment, the amino-siloxane of the absorbent composition has a cyclic core structure. For example, the amino-siloxane includes structure (III):

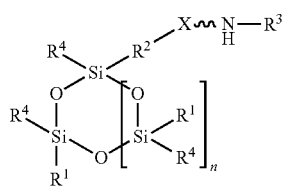

(III)

wherein $R^1$ is independently at each occurrence a $C_1$-$C_6$ aliphatic or aromatic radical; $R^2$ is independently at each occurrence a $C_2$-$C_{10}$ aliphatic or aromatic radical; $R^3$ is independently at each occurrence a hydrogen atom or a $C_1$-$C_6$ aliphatic or aromatic radical; $R^4$ is independently at each occurrence a $C_1$-$C_{18}$ aliphatic or aromatic radical or $R^5$, wherein $R^5$ comprises structure (IV):

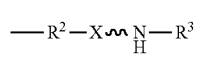

(IV)

wherein X is independently at each occurrence an oxygen atom or a sulfur atom; and n is between 1 and 6.

The amino-siloxane includes a silicon and oxygen pair repeat unit (denoted by the brackets). In an embodiment, the amino-siloxane can include from 1 to 6 pairs of the repeat unit. Since the core also include two other pairs of silicon and oxygen atoms outside of the brackets, the ring-shaped core can have between three and eight alternating pairs of silicon and oxygen atoms (e.g., for a total of between six and sixteen atoms in the ring). Although only one amine functional arm is shown in structure (III), it is noted that each $R^4$ can include the structure (IV). Therefore, the amino-siloxane can include up to eight functional arms extending from the cyclic core if the core has eight total silicon atoms (e.g., n is 6) and each $R^4$ is the structure (IV) of $R^5$. The details and various alternatives of the amine functional arms of the structure (III) are the same as the amine functional arms of the structure (I) described above.

In one embodiment, the amino-siloxane of structure (III) has a ring-shaped core that includes four alternating pairs of silicon and oxygen atoms, such that n is 2. Such an amino-siloxane can have between one and four amine functional arms. The embodiment in which the amino-siloxane has four functional arms extending from the silicon atoms of the ring-shaped core structure is shown in structure (IIIa):

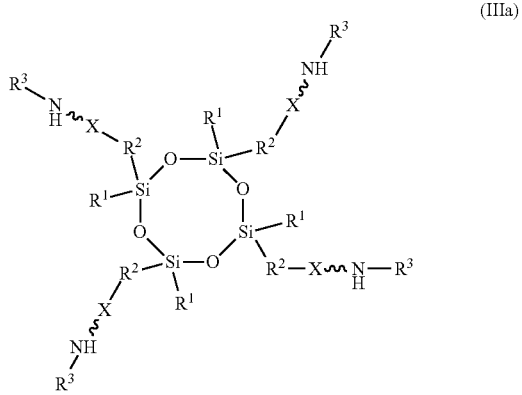

(IIIa)

The multiple functional arms may be identical to one another, but alternatively may differ from one another.

The absorbent compositions described herein include amino-siloxanes having structures (I) and (III), including variations thereof. The absorbent compositions are solvents that are liquid under ambient conditions. The absorbent compositions are configured to react with a target gas, such as $CO_2$, to form a reaction product, which is referred to herein as an adduct. More specifically, the adduct of a secondary functional amine group with $CO_2$ is a carbamate. The absorbent compositions described herein are useful for capturing $CO_2$ because the adduct remains in a substantially flowable, liquid phase under reaction conditions following exposure to $CO_2$. The term "substantially liquid" as used herein means that the amino-siloxane and the adduct are characterized by a melting temperature or a glass transition temperature lower than the temperature at which the amino-siloxane absorbs the $CO_2$. The reaction conditions may include a temperature range between about 10 degrees Celsius (C) and about 70 degrees C. For example, the temperature range under reaction conditions may be between about 20 degrees C. and about 70 degrees C., or between about 20 degrees C. and about 50 degrees C. The pressure range under ambient conditions may be between about 97 kPa and about 105 kPa.

The absorbent composition optionally may include one or more other components in addition to the amino-siloxane. For example, the absorbent composition may have an oxidation inhibitor or antioxidant (e.g., to increase the oxidative stability), a corrosion inhibitor, an anti-foaming agent, or the like.

In one or more embodiments, the amino-siloxane-containing absorbent composition is substantially free of a carrier fluid, such as water, ionic liquids, glycols, and combinations thereof. As defined above, an absorbent composition that is substantially free of a carrier fluid may be completely free of the carrier fluid or may have a content of the carrier fluid that is less than a threshold range, such as less than fifteen percent volume of the carrier fluid in the absorbent composition. Therefore, the presence of a carrier fluid in an absorbent composition is sufficiently low to not significantly or noticeably adversely affect the gas absorption process, such as by decreasing the reactivity and $CO_2$ uptake (or absorption capability) of the amino-siloxane. In addition, any carrier fluid present is in a sufficiently low concentration such that a significant energy load is not required to evaporate the carrier fluid.

The amino-siloxane absorbent compositions described herein may not require the use of co-solvents, such as carrier fluids, in order to achieve an acceptably low viscosity level that is a flowable liquid even after reacting with $CO_2$ gas. Further, the amino-siloxane compositions have low volatility, high thermal stability, and a high net capacity for $CO_2$. The amino-siloxane compositions can be appropriate for large-scale implementation. For these reasons, the amino-siloxane compositions provided herein may perform better than conventional absorbent solvents utilized for absorbing $CO_2$ from process gas streams.

FIG. 1 is a flow chart of a method 100 for reducing an amount of a target gas in a process stream according to an embodiment. The method 100 is performed using the absorbent compositions described herein, which include one or more of the amino-siloxane molecules having structures (I) and (III), including variations thereof. At 102, an absorbent composition including an amino-siloxane is provided. For example, the absorbent composition may be provided by formulating or preparing the absorbent composition, such as by synthesizing the amino-siloxane molecules and/or by mixing the amino-siloxane molecules with additional components of the absorbent composition, such as an antioxidant, an anti-foaming agent, a corrosion inhibitor, and/or the like. In an embodiment, the absorbent composition is substantially free of a carrier fluid with the amino-siloxane. Providing the absorbent composition may additionally include transporting the absorbent composition to the process stream. The amino-siloxane molecules in the absorbent compositions have a functional amine group at one or more termini of the molecules, and the amine groups are spaced apart from an oxygen or sulfur atom via an ethyl linkage. For example, the amino-siloxane may have the structure (I):

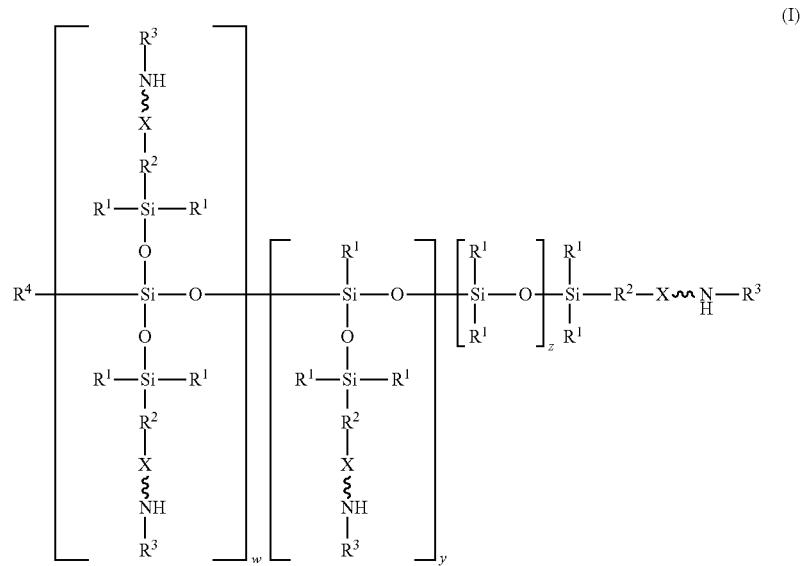

(I)

wherein $R^1$ is independently at each occurrence a $C_1$-$C_6$ aliphatic or aromatic radical; $R^2$ is independently at each occurrence a $C_2$-$C_{10}$ aliphatic or aromatic radical; $R^3$ is independently at each occurrence a hydrogen atom or a $C_1$-$C_6$ aliphatic or aromatic radical; $R^4$ is independently at each occurrence a $C_1$-$C_{18}$ aliphatic or aromatic radical or $R^5$, wherein $R^5$ comprises structure (II):

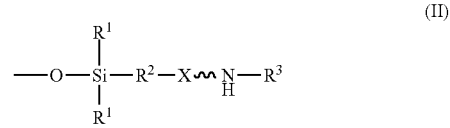

(II)

wherein X is independently at each occurrence an oxygen atom or a sulfur atom; w is between 0 and 5; y is between 0 and 10; and z is between 0 and 10; wherein, when $R^4$ is $R^5$ comprising the structure (II), a sum of w, y, and z is greater than or equal to 0, and, when $R^4$ is not $R^5$, a sum of w, y, and z is greater than or equal to 1. In an alternative embodiment, the method of reducing the amount of a target gas in a process stream includes the step of contacting the process stream with an absorbent composition containing an amino-siloxane having structure (III), as described herein.

At 104, the process stream is contacted with the absorbent composition to absorb the target gas from the process stream. The target gas is absorbed by the amino-siloxanes of the absorbent composition, which reduces the amount (e.g., concentration) of the target gas in the process stream downstream of the contact location with the absorbent composition. The target gas in one or more embodiments is $CO_2$, but the absorbent composition may be used to absorb other target gases in addition to $CO_2$ or as an alternative to $CO_2$ in other embodiments. The process stream is gaseous but may contain solid or liquid components. The process stream may be at a wide range of temperatures and pressures, depending on the application. The process stream may be a process stream from a manufacturing process within a power plant (e.g., coal, natural gas, or the like), a factory, a manufacturing plant, or the like. The manufacturing process may be associated with a chemical industry, a cement industry, a steel industry, or the like. The process stream may be generated from a combustion process, a gasification process, a landfill, a furnace, a steam generator, a gas turbine, a boiler, or the like. For example, the process stream may be a flue gas including a gas mixture exhausted as a result of the processing of fuels, such as natural gas, biomass, gasoline, diesel fuel, coal, oil shale, fuel oil, tar sands, or combinations thereof. The method may be useful in power plants requiring absorbents for reducing $CO_2$ emissions. In another embodiment, the process stream includes syngas generated by gasification at a reforming plant.

The step of contacting the process stream with the amino-siloxane absorbent composition optionally may be effected under controlled conditions (e.g., temperature, pressure, humidity, etc.) in a reaction chamber. Non-limiting examples of suitable reaction chambers may include an absorption tower, a wetted wall tower, a spray tower, a venturi scrubber, or combinations thereof. For example, the process stream may be contacted with the absorbent composition at a temperature between about 10 degrees C. and 70 degrees C., between about 20 degrees C. and about 70 degrees C., or between about 20 degrees C. and about 50 degrees C. Upon contacting the process stream with the absorbent composition, an adduct stream is formed, as well as a $CO_2$-lean gas stream. The $CO_2$-lean gas stream has a $CO_2$ content lower than that of the process stream. The $CO_2$-lean gas stream may be transported to another vessel or system for subsequent processing, may be transported to another vessel or system for storage, or may be released into the environment. The adduct stream includes the adduct or reaction product, and may be further subjected to one or more desorption steps to release $CO_2$ and regenerate the absorbent composition. In one or more embodiments, the adduct in the adduct stream has a sufficiently low viscosity such that the adduct is substantially liquid. For example, the adduct is substantially liquid within at least a temperature range between about 20 degrees C. and about 70 degrees C. Therefore, the adduct can flow through a liquid-based processing system to a different location for subsequent desorption and/or storage.

Several absorbent compositions including different amino-siloxanes described herein were prepared and experimentally tested as working examples. The amino-siloxanes of the working examples all included at least one functional arm having an amine group on the terminus separated from a heteroatom, such as an oxygen atom or a sulfur atom, by an ethyl linkage. In addition, one absorbent composition including an amino-siloxane with a different functional arm was prepared and experimentally tested as a control example. The working examples and the control example were all subjected to $CO_2$ uptake testing, which measures the amount of $CO_2$ absorbed by the absorbent compositions. The results were used to compare the effectiveness of the working examples to the control example.

FIGS. 2A and 2B show a table 200 of five different working example absorbent compositions, identified as entries A-E, and two control example absorbent compositions, identified as entries F and G. The table 200 includes a Classification column that provides a short description of the amino-siloxanes in each absorbent composition; an Entry column that provides a shorthand identifier for each amino-siloxane; a Compound column that shows the molecular structure of the amino-siloxanes, a $CO_2$ Uptake column that provides a percentage of $CO_2$ absorbed by each amino-siloxane relative to a calculated theoretical amount of $CO_2$ that could be absorbed by each amino-siloxane; and a Physical State column that provides a qualitative observation of the phase and/or viscosity of the reaction product or adduct for each amino-siloxane after reacting with $CO_2$ gas. It is noted that the shorthand identifiers listed in the Entry column are used herein as shorthand references for identifying the amino-siloxanes without showing the molecular structure or reciting the chemical nomenclature.

As shown in table 200, all five of the working example amino-siloxanes are embodiments of the amino-siloxane having structure (I), as described herein, such that the working example amino-siloxanes are linear and/or branched. For example, the amino-siloxane of the first working example A has a linear core in which w and y are both 0, and z is 1. In addition, $R^1$ at each occurrence is a methyl group, the spacer $R^2$ at each occurrence is a propyl group, $R^3$ at each occurrence is a hydrogen atom, $R^4$ is $R^5$ having the structure (II), and the heteroatom X at each occurrence is oxygen. Since $R^3$ is hydrogen, the amino-siloxane has primary amines at the termini.

The amino-siloxanes of the second, third, and fourth working examples B, C, and D, respectively, include amino-siloxanes similar to the amino-siloxane of entry A but have secondary amines at the termini instead of primary amines. For example, the amino-siloxane B has methylamine groups at the termini, the amino-siloxane C has ethylamine groups at the termini, and the amino-siloxane D has butylamine groups at the termini.

The amino-siloxane of the fifth working example E has the tetra-functional branched core shown in structure (Ic) above. For example, $R^1$ at each occurrence is a methyl group, the spacer $R^2$ at each occurrence is a propyl group, $R^3$ at each occurrence is a butyl group (e.g., a $C_4$ aliphatic radical), and the heteroatom X at each occurrence is oxygen. Although the amino-siloxanes of the experimentally-tested absorbent compositions all include oxygen as the heteroatom, it is recognized that sulfur may be used as the heteroatom instead of oxygen in other embodiments.

The control example amino-siloxanes F and G have linear cores. The amino-siloxane F has ethylamine groups at the termini, similar to the working example amino-siloxane C. The amino-siloxane G has butylamine groups at the termini, similar to the working examine amino-siloxane D. The structures of the working example amino-siloxanes F and G differ from the structures of the amino-siloxanes C and D because the amino-siloxanes F and G lack a heteroatom between a propyl spacer and an ethyl linkage on the functional arms. Instead of the heteroatom, the control example amino-siloxanes F and G have a linear $C_6$ spacer extending between the siloxane group and the amine group at the terminus.

The data in the $CO_2$ Uptake column and Physical State column was obtained experimentally by performing $CO_2$ uptake testing. The working examples and the control example were all subjected to the $CO_2$ uptake testing under the same experimental conditions. For example, the $CO_2$ uptake testing involved contacting dry $CO_2$ gas with a known amount (e.g., an amount between 1-10 g) of the respective absorbent compositions or solvent in a reaction flask. The $CO_2$ gas was generated via the sublimation of dry ice and passed through a drying tube (e.g., a $CaCl_2$ drying tube). The mixture was mechanically stirred for a designated time period at a constant temperature. The data shown in the table 200 was measured by reacting the absorbent compositions with the $CO_2$ gas at a temperature of 23 degrees C. In an embodiment, the mixture was mixed at 200 rpm for at least 30 minutes, such as between about 30 minutes and about two hours. All seven of the absorbent compositions tested, including the amino-siloxanes A-G, were substantially free from carrier fluids.

The reaction was considered completed when either a preset elapsed time was reached or a substantially constant weight of the mixture was achieved. For example, the reaction flask with the absorbent composition therein was weighed prior to introducing the $CO_2$ gas into the reaction flask, and the weight of the reaction flask was monitored during the reaction to measure a weight change of the flask. The weight gain experienced during the reaction was attributable to the $CO_2$ that reacted with the absorbent composition. The experimental weight gain for each tested absorbent composition was calculated by subtracting the difference between the final and initial weights. The experimental weight gain was compared to a theoretical weight gain to determine a $CO_2$ uptake percentage. The theoretical weight gain was calculated based on the initial weight and the molecular weight of the candidate absorbent composition. For example, the theoretical weight gain was calculated assuming one mole of $CO_2$ required two moles of primary or secondary amine for complete reaction. The $CO_2$ uptake percentage was calculated by dividing the difference between the experimental weight gain and the theoretical weight gain by the theoretical weight gain and then multiplying the result by 100. Additionally, the physical state of the reaction product (or adduct) was observed and reported when the reaction was completed, as shown in the Physical State column.

The results of the solvent tests are shown in table 200. The data in table 200 shows that all seven amino-siloxanes A-G, including the control examples, were able to absorb $CO_2$. However, there were differences in the observed viscosities of the adducts, such that the working example amino-siloxanes B, C and D had lower viscosity adducts than the adducts of the entries A, E, F, and G. The amino-siloxanes B, C, and D had secondary amines at the termini, which may have suppressed intermolecular hydrogen bonding interactions, resulting in the lower viscosities. The primary amines of the amino-siloxane A may have allowed some intermolecular hydrogen bonding, resulting in the observed thicker, more viscous liquid. Furthermore, the thick, flowable liquid adduct of the tetra-functional branched amino-siloxane E may have been caused by intermolecular interactions between the four functional arms of the molecules. The control amino-siloxanes F and G had adducts that were thicker and more viscous than the adducts of the similar amino-siloxanes C and D, respectively. Therefore, the presence of the oxygen heteroatoms in the working example amino-siloxanes C and D significantly reduced the viscosity of the $CO_2$ adducts (e.g., carbamate fluid) relative to the similar control example amino-siloxanes F and G.

The table 200 also shows that all seven amino-siloxanes were able to absorb $CO_2$ at percentages from 80% to 115% of the respective theoretical amounts. The working example amino-siloxanes B, C, and D and the control example amino-siloxanes F and G showed greater $CO_2$ uptake percentages than the working example amino-siloxanes A and E, and therefore performed slightly better at $CO_2$ capture. However, it is noted that a satisfactory level of $CO_2$ uptake for a potential application may be any percentage greater than a designated lower limit, such as 60% or 70% of theoretical. In this case, all seven amino-siloxanes exceeded these designated lower limits and therefore would be considered satisfactory for use in the application based on $CO_2$ uptake.

The results of the experimental testing show that all five of the working example absorbent compositions and the two control example absorbent compositions were able to absorb $CO_2$ at satisfactory or desirable levels. However, the working example amino-siloxanes B, C, and D performed better than the other tested amino-siloxanes because the $CO_2$ adducts had lower viscosities than the $CO_2$ adducts of the other tested amino-siloxanes, and were readily flowable liquids even without the presence of a co-solvent diluent (e.g., a carrier fluid) in the absorbent compositions.

Synthesis of Amino-Siloxane A

The chemical nomenclature for the amino-siloxane A is 2,2'-(((1,1,3,3,5,5-hexamethyltrisiloxane-1,5-diyl)bis(propane-3,1-diyl))bis(oxy))diethanamine-ethanamine and the preparation is as follows. Cesium carbonate (53 g, 161.2 mmol) was added to a solution of allyl chloride (18.6 g, 242 mmol) and t-butyl(2-hydroxyethyl)carbamate (13 g, 80.6 mmol) in toluene (150 mL) and then the mixture was sparged with $N_2$. Then palladium dibenzylidene acetone (925 mg, 1.008 mmol) and dicyclohexyl X Phos (1.93 g, 4.03 mmol) were added and the reaction mixture again sparged with $N_2$ and heated to 110° C. After 3.5 h, the mixture was cooled, filtered through Celite, concentrated and the residue purified by chromatography eluting with hexanes to 10% EtOAc in hexanes to give 11.5 g (71%) t-butyl(2-(allyloxy)ethyl)carbamate as a yellow oil. $^1$H NMR (CDCl$_3$) δ: 5.92 (m, 1H); 5.29 (dq, J=17.2, 1.5 Hz, 1H); 5.52 (dq, J=10.4, 1.3 Hz, 1H); 5.21 (dq, J=10.4, 1.3 Hz, 1H); 4.01 (dt, J=5.6, 1.3 Hz, 2H); 3.52 (t, J=5.0 Hz, 2H); 3.35 (m, 2H); 1.47 (s, 9H).

A mixture of t-Butyl(2-(allyloxy)ethyl)carbamate (3.0 g, 14.9 mmol) in toluene (5 mL) was added to a solution of 1,1,3,3,5,5-hexamethyltrisiloxane (1.55 g, 7.45 mmol) and Karstedt's catalyst (1 drop of 4 wt % Pt in xylenes) in toluene (10 mL) at ambient temperature then heated to 80° C. for 4 h. After this time the reaction mixture was concentrated to give 4.94 g of di-t-butyl((((1,1,3,3,5,5-hexamethyltrisiiloxane)-1,5-diyl)bis(propane-3,1-diyl))bis(oxy))bis (ethane-2,1-diyl))dicarbamate as a brown oil. $^1$H NMR (CDCl$_3$) δ: 4.94 (br, 2H); 3.50 (t, J=5.3 Hz, 4H); 3.41 (t, J=7.0 Hz, 4H); 3.33 (m, 4H); 1.61 (m, 4H); 1.47 (18H); 0.54 (m, 4H); 0.10 (m, 18H).

Trifluoroacetic acid (TFA, 5 mL) was added to a solution of di-t-butyl((((1,1,3,3,5,5-hexamethyltrisiiloxane)-1,5-diyl)bis(propane-3,1-diyl))bis(oxy))bis(ethane-2,1-diyl))dicarbamate (4.55 g, 7.45 mmol) in $CH_2Cl_2$ (10 mL) at ambient temperature. After 4 h the mixture was concentrated and the residue partitioned between toluene and 1N NaOH. The phases were separated and the organic layer dried over MgSO$_4$, filtered and concentrated to give 2.24 g (73%) of product as a light brown oil. $^1$H NMR (CDCl$_3$) δ: 3.47 (t, J=5.5 Hz, 4H); 3.42 (t, J=7.1 Hz, 4H); 2.87 (t, J=5.1 Hz, 4H); 1.62 (m, 4H); 1.40 (br, 4H); 0.55 (m, 4H); 0.09 (m, 23H). $^{13}$C NMR (CDCl$_3$): 73.91, 72.95, 42.01, 23.51, 23.46, 14.31, 14.19, 1.28, 1.17, 1.06, 0.28, 0.11 ppm.

Synthesis of Amino-Siloxane B

The chemical nomenclature for the amino-siloxane B is 2,2'-(((1,1,3,3,5,5-hexamethyltrisiloxane-1,5-diyl)bis(propane-3,1-diyl)bis(oxy))bis(N-methylethanamine) and the preparation is as follows. A solution of 2-allyloxyethanol (45 g, 0.44 mole) in THF (300 mL) was treated with triethylamine (62 mL, 45 mole) followed by para-toluene sulfonyl chloride (84 g, 0.44 mole). The mixture was mechanically stirred at 60° C. for 18 h then cooled to ambient temperature. The solid was removed by filtration and the filtrate concentrated in vacuo. The crude product was dissolved in CHCl$_3$, washed 3× with water, dried over Na$_2$SO$_4$, filtered and concentrated to give 10.3 g 2-(allyloxy)ethyl 4-methylbenzenesulfonate (93% pure, 85% yield). $^1$H NMR (CDCl$_3$) δ: 7.80 (d, J=7.1 Hz, 2H); 7.35 (d, J=7.1 Hz, 2H); 5.81 (m, 1H); 5.22 (dm, J=17.6 Hz, 1H); 5.17 (dm, J=10.3 Hz, 1H); 4.17 (t, J=4.7 Hz, 2H); 3.94 (d, J=5.6 Hz, 1H); 3.62 (t, J=5.6 Hz, 2H); 2.45 (s, 3H). $^{13}$C {$^1$H} NMR (CDCl$_3$): 144.81, 134.11, 133.01, 129.82, 127.97, 117.40, 72.14, 69.27, 67.43, 21.63 ppm.

A mixture of 2-(Allyloxy)ethyl 4-methylbenzenesulfonate (6.5 g, 25.4 mmol), THF (10 mL) and methylamine (65 mL of 2M in THF, 130 mmol) were added together in a pressure bottle and heated at 40° C. for 3 days after which the reaction mixture was concentrated, dissolved in CHCl$_3$, washed with water (3×), dried over Na$_2$SO$_4$, filtered, concentrated and distilled at 50° C./60 torr to give 1.9 g (66%) 2-allyloxy-N-methylaminoethane. $^1$H NMR (CDCl$_3$) δ: 5.93 (m, 1H); 5.28 (dm, J=17.2 Hz, 1H); 5.19 (dm, J=10.4 Hz, 1H); 4.01 (dm, J=5.5 Hz, 2H); 3.57 (t, J=5.8 Hz, 2H); 2.78 (t, J=5.5 Hz, 2H); 2.47 (s, 3H); 1.73 (br, 1H). $^{13}$C {$^1$H} NMR (CDCl$_3$): 134.75, 117.07, 72.10, 69.35, 51.42, 36.35 ppm.

The compound 1,1,3,3,5,5-hexamethyltrisiloxane (0.76 g, 3.7 mmol) was dissolved in toluene (1 mL) then a solution of 2-allyloxy-N-methylaminoethane (0.92 g, 8.0 mmol) in toluene (2 mL) was added followed by 1 drop of Karstedt's catalyst (4.7% Pt in xylenes). The reaction mixture was allowed to stir at 40° C. for 20 h then an additional aliquot of olefin was added (200 mg) followed by heating for an additional 20 h. The reaction mixture was then concentrated to give 1.16 g (72%) product. $^1$H NMR (CDCl$_3$) δ: 3.54 (t, J=5.2 Hz, 4H); 3.41 (t, J=7.0 Hz, 4H); 2.76 (m, 4H); 2.46 (s, 6H); 1.70 (br, 2H); 1.61 (m, 4H); 0.53 (m, 4H); 0.08 (s, 18H). $^{13}$C {$^1$H} NMR (CDCl$_3$): 74.01, 69.76, 51.47, 36.34, 23.42, 14.17, 1.16, 0.10 ppm.

Synthesis of Amino-Siloxane C

The chemical nomenclature for the amino-siloxane C is 2,2'-(((1,1,3,3,5,5-hexamethyltrisiloxane-1,5-diyl)bis(propane-3,1-diyl))bis(oxy))bis(N-ethylethanamine) and the preparation is as follows. 2-(Allyloxy)ethyl 4-methylbenzenesulfonate (10.0 g, 39 mmol) and ethylamine (2M, 100 mL in THF, 200 mmol) were added together in a pressure bottle and heated at 50° C. for 10 h. After cooling, the solid was removed by filtration, the solution concentrated, dissolved in CHCl$_3$, washed with water (3×) dried over Na$_2$SO$_4$, filtered and concentrated to give 2.2 g 2-(allyloxy)-N-ethylethanamine that contained a small amount of tosylate salt. (31% yield). $^1$H NMR (CDCl$_3$) δ: 5.83 (m, 1H); 5.19 (dd, J=17.5, 1.5 Hz, 1H); 5.10 (dd, J=1-0.3, 1.5 HZ, 1H); 3.91 (dt, J=5.6, 1.3 Hz, 2H); 3.48 (t, J=5.0 Hz, 2H); 2.72 (t, J=5.3 Hz, 2H); 2.59 (q, J=7.1 Hz, 2H); 1.35 (br, 1H); 1.03 (t, J=7.1 Hz, 3H). $^{13}$C {$^1$H} NMR (CDCl$_3$): 144.71, 137.90, 133.15, 129.84, 127.86, 115.04, 70.46, 32.90, 28.18, 24.52, 21.61 ppm.

The compound 2-(allyloxy)-N-ethylethanamine (1.5 g, 11.6 mol) was added to a solution of 1,1,3,3-tetramethyldisiloxane (0.67 g, 5.0 mol) in toluene (1 mL) followed by 1 drop of Karstedt's catalyst (4.7% Pt in xylenes). The reaction mixture was heated to 60° C. and after 16 h another aliquot of catalyst was added and the heat increased to 85° C. After 6 more h, the reaction mixture was concentrated and chromatographed on silica get eluting with CHCl$_3$ then CHCl$_3$ with 10% (MeOH:NH$_4$OH/9:1) to give 0.67 g (34%) chain extended product). $^1$H NMR (CDCl$_3$) δ: 3.55 (t, J=5.3 Hz, 4H); 3.41 (td, J=6.9, 1.5 Hz, 4H); 2.80 (t, J=5.3 Hz, 4H); 2.68 (q, J=7.2 Hz, 4H); 1.61 (m, 6H); 1.13 (t, J=7.1H, 6H); 0.51 (m, 4H); 0.08 (m, 18H). $^{13}$C {$^1$H} NMR (CDCl$_3$): 74.02, 70.10, 49.36, 44.11, 23.45, 15.30, 14.27, 14.16, 1.17, 0.27, 0.10 ppm.

Synthesis of Amino-Siloxane D

The chemical nomenclature for the amino-siloxane D is N,N'-((((1,1,3,3,5,5-hexamethyltrisiloxane-1,5-diyl)bis(propane-3,1-diyl)bis(oxy))bis(ethane-2,1-diyl)bis(butan-1-amine) and the preparation is as follows. 2-(Allyloxy)ethyl 4-methylbenzenesulfonate (6.4 g, 25 mmol), n-butylamine (25 mL, 252 mmol) and THF (100 mL) were added together and heated at 60° C. for 22 h. After this time, the reaction mixture was concentrated in vacuo and the crude product dissolved in CHCl$_3$, washed 3× with water, dried over Na$_2$SO$_4$, filtered and concentrated to give 3.19 g 2-allyloxy-N-butylaminoethane (82%). $^1$H NMR (CDCl$_3$) δ: 5.92 (m, 1H); 5.28 (dq, J=17.2, 1.7 Hz, 1H); 5.19 (dq, J=10.3, 1.5 Hz, 1H); 4.00 (dt J=5.8, 1.5 2H); 3.57 (t, J=5.2 Hz, 2H); 2.81 (t, J=5.3 Hz, 2H); 2.63 (t, J=7.4 Hz, 2H); 1.68 (br, 1H); 1.49 (m, 2H); 1.36 (m, 2H); 0.92 (t, J=7.2 Hz, 3H). $^{13}$C {$^1$H} NMR (CDCl$_3$): 134.79, 117.01, 72.07, 69.59, 49.71, 49.46, 32.22, 20.48, 14.00 ppm.

The compound 1,1,3,3,5,5-hexamethyltrisiloxane (0.30 g, 1.5 mmol) was dissolved in toluene (1 mL) then a solution of 2-allyloxy-N-butylaminoethane (0.50 g, 3.2 mmol) in toluene (2 mL) was added followed by 1 drop of Karstedt's catalyst (4.7% Pt in xylenes). The reaction mixture was allowed to stir at 60° C. for 4 h then concentrated to give 0.59 g (76%) product. $^1$H NMR (CDCl$_3$) δ: 3.54 (m, 4H); 3.41 (t, J=7.0 Hz, 4H); 2.80 (m, 4H); 2.64 (m, 4H); 1.60 (m, 4H); 1.50 (m, 4H); 1.36 (nm, 4H); 0.93 9t, J=7.3 Hz, 6H); 0.52 (m, 4H); 0.08 (s, 21.6H). $^{13}$C NMR (CDCl$_3$): 73.98, 69.81, 49.67, 49.43, 32.18, 23.40, 20.47, 14.17, 13.99, 1.27, 0.08 ppm.

Synthesis of Amino-Siloxane E

The chemical nomenclature for the amino-siloxane E is Tetrakis((3-(2-butylamino)ethoxy)propyl)dimethylsilyl)

orthosilicate and the preparation is as follows. Tetrakis(dimethylsiloxy)silane (0.70 g, 2.12 mmol) was dissolved in toluene (1 mL) then a solution of 2-allyloxy-N-butylaminoethane (1.5 g, 9.55 mmol) in toluene (1 mL) was added followed by 1 drop of Karstedt's catalyst (4.7% Pt in xylenes). The mixture was heated to 60° C. with an exotherm to 80° C. noted. After 3 h an additional 200 mg of olefin and another drop of catalyst was added and the reaction mixture allowed to stir for another 3 h. The mixture was concentrated in vacuo (90° C./0.5 torr) to give 1.6 g product (79%). $^1$H NMR (CDCl$_3$) δ: 3.55 (t, J=5.2 Hz, 8H); 3.40 (t, J=6.9 Hz, 8H); 2.79 (t, J=5.0 Hz, 8H); 1.93 (br, 4H); 2.63 (t, J=6.8 Hz, 8H); 1.61 (m, 8H); 1.50 (m, 8H); 1.37 (m, 8H); 0.93 (t, J=7.3 Hz, 12H); 0.56 (m, 8H); 0.10 (s, 24H). $^{13}$C NMR (CDCl$_3$): 73.97, 69.94, 49.68, 49.50, 32.21, 23.33, 20.49, 14.01, −0.14 ppm.

Synthesis of Amino-Siloxane F

The chemical nomenclature for the control example amino-siloxane F is 6,6'-(1,1,3,3,5,5-hexamethyltrisiloxane-1,5-diyl)bis(N-ethylhexan-1-amine) and the preparation is as follows. Hexyl-4-methylbenzenesulfonate (11.5 g, 45 mmol), n-ethylamine solution (150 mL, 300 mmol, 2N in THF) were added together and heated at 50° C. for 16 h in a pressure bottle. After this time, the reaction mixture was concentrated in vacuo and the crude product dissolved in CHCl$_3$, washed 3× with water, dried over Na$_2$SO$_4$, filtered, concentrated and chromatographed on silica gel to give 0.53 g N-ethylhex-5-en-1-amine (9%). $^1$H NMR (CDCl$_3$) δ: 5.78 (m, 1H); 4.98 (d, J=17.2 Hz, 1H); 4.93 (d, J=10.1 Hz, 1H); 2.62 (m, 4H); 2.05 (q, J=6.8 Hz, 2H); 1.50 (m, 2H); 1.39 (m, 2H); 1.09 (t, J=17.1 Hz, 3H); 0.85 (br, 1H). $^{13}$C NMR (CDCl$_3$): 138.67, 114.47, 49.53, 43.98, 33.58, 29.37, 26.62, 15.02 ppm.

The compound N-ethylhex-5-en-1-amine (0.53 g, 4.17 mmol) was added to 1,1,3,3,5,5-hexamethyltrisiloxane (0.40 g, 1.96 mmol) followed by 1 drop of Karstedt's catalyst (4.7% Pt in xylenes). The reaction mixture was allowed to stir at 65° C. for 16 h then concentrated to give 0.64 g (78%) product. $^1$H NMR (CDCl$_3$) δ: 2.65 (q J=7.2 Hz, 4H); 2.60 (t, J=10.3 Hz, 4H); 1.49 (m, 4H); 1.33 (m, 12H); 1.11 (t, J=7.2 Hz, 6H); 0.55 (m, 4H); 0.06 (m, 21.3H). $^{13}$C NMR (CDCl$_3$): 50.01, 44.20, 33.37, 30.16, 27.18, 23.19, 18.25, 15.34, 1.28, 0.18 ppm.

Synthesis of Amino-Siloxane G

The chemical nomenclature for the control example amino-siloxane G is 6,6'-(1,1,3,3,5,5-hexamethyltrisiloxane-1,5-diyl)bis(N-butylhexan-1-amine) and the preparation is as follows. Hexyl-4-methylbenzenesulfonate (7.0 g, 27.55 mmol), n-butylamine (25 mL, 252 mmol) and THF (25 mL) were added together and heated at 50° C. for 20 h. After this time, the reaction mixture was concentrated in vacuo and the crude product dissolved in CHCl$_3$, washed 3× with water, dried over Na$_2$SO$_4$, filtered and concentrated to give 4.15 g N-butylhex-5-en-1-amine (82%). $^1$H NMR (CDCl$_3$) δ: 5.81 (m, 1H); 5.01 (dm, J=17.2, 1.7 Hz, 1H); 4.95 (dm, J=10.4, 1.5 Hz, 1H); 2.59 (m, 4H); 2.06 (q, J=7.1 Hz, 2H); 1.45 (m, 6H); 1.35 (m, 2H); 0.92 (t, J=17.1 Hz, 3H). $^{13}$C NMR (CDCl$_3$): 138.79, 114.39, 49.97, 49.82, 33.67, 32.34, 29.70, 26.70, 20.52, 14.01 ppm.

The compound 1,1,3,3,5,5-hexamethyltrisiloxane (2.0 g, 12.9 mmol) was dissolved in toluene (1 mL) then a solution of N-butylhex-5-en-1-amine (1.3 g, 6.36 mmol) in toluene (2 mL) was added followed by 1 drop of Karstedt's catalyst (4.7% Pt in xylenes). The reaction mixture was allowed to stir at 50° C. for 5 h then concentrated to give 3.10 g (95%) product. $^1$H NMR (CDCl$_3$) δ: 2.59 (td, J=7.2, 2.5 Hz, 8H); 1.48 (m, 8H); 1.34 (m, 16H); 0.92 (t, J=7.4 Hz, 6H); 0.53 (m, 4H); 0.06 (m, 20H). $^{13}$C NMR (CDCl$_3$): 50.22, 49.84, 33.38, 32.35, 30.16, 27.17, 23.19, 20.53, 18.25, 14.01, 1.28, 0.18 ppm.

As used herein, a structure, composition, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein. Instead, the use of "configured to" as used herein denotes structural adaptations or characteristics, and denotes structural requirements of any structure, composition, or element that is described as being "configured to" perform the task or operation.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments, and also to enable a person having ordinary skill in the art to practice the various embodiments, including making and using any compositions or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal language of the claims.

What is claimed is:

1. An absorbent composition comprising an amino-siloxane having structure (I):

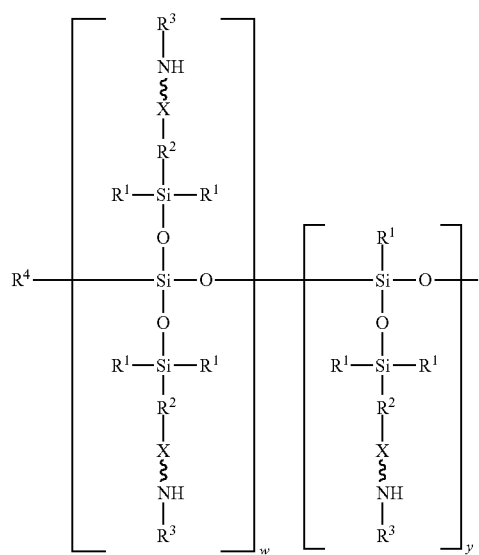

(I)

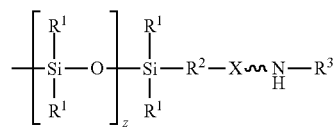

(II)

wherein X is independently at each occurrence an oxygen atom or a sulfur atom; w is between 0 and 5; y is between 0 and 10; and z is between 0 and 10; wherein, when $R^4$ is $R^5$ comprising the structure (II), a sum of w, y, and z is greater than or equal to 0, and, when $R^4$ is not $R^5$, a sum of w, y, and z is greater than or equal to 1; and wherein the amino-siloxane comprises structure (Ib):

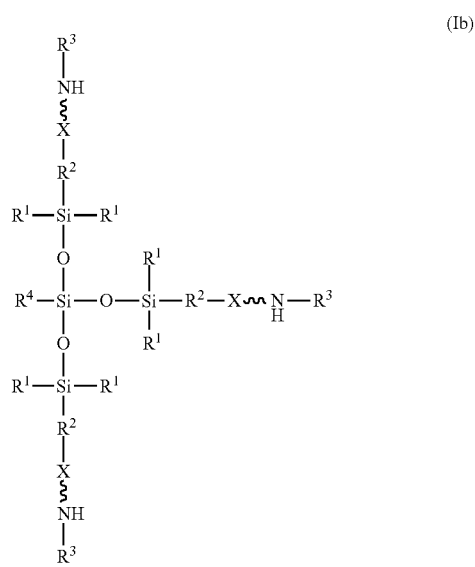

(Ib)

wherein $R^1$ is independently at each occurrence a $C_1$-$C_6$ aliphatic or aromatic radical; $R^2$ is independently at each occurrence a $C_2$-$C_{10}$ aliphatic or aromatic radical; $R^3$ is independently at each occurrence a hydrogen atom or a $C_1$-$C_6$ aliphatic or aromatic radical; $R^4$ is independently at each occurrence a $C_1$-$C_{18}$ aliphatic or aromatic radical or $R^5$, wherein $R^5$ comprises structure (II):

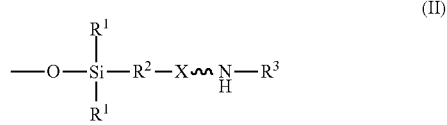

(II)

and X is independently at each occurrence an oxygen atom or a sulfur atom.

2. The absorbent composition of claim 1, wherein the absorbent composition is substantially free of a carrier fluid with the amino-siloxane.

3. The absorbent composition of claim 1, wherein the amino-siloxane is configured to form a reaction product with carbon dioxide, the reaction product being substantially liquid at temperatures between about 20 degrees Celsius and about 50 degrees Celsius.

4. An absorbent composition comprising an amino-siloxane having structure (I):

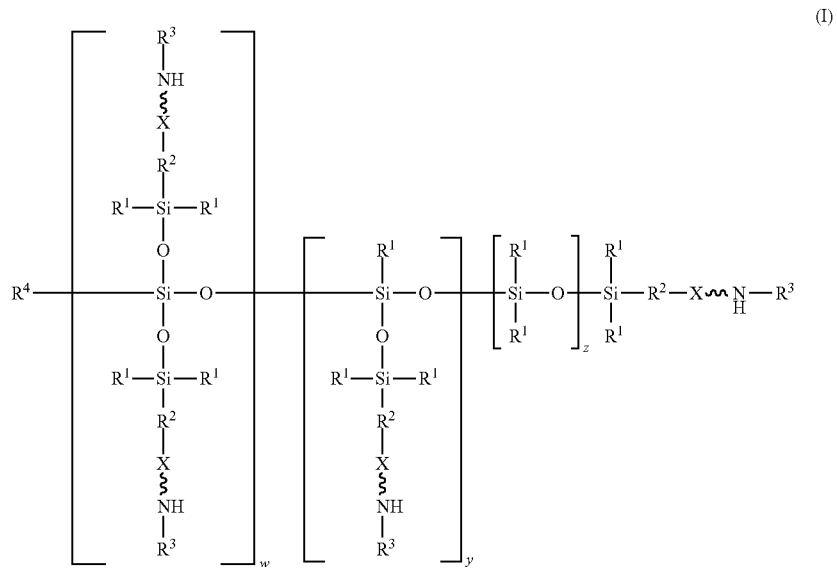

wherein $R^1$ is independently at each occurrence a $C_1$-$C_6$ aliphatic or aromatic radical; $R^2$ is independently at each occurrence a $C_2$-$C_{10}$ aliphatic or aromatic radical; $R^3$ is independently at each occurrence a hydrogen atom or a $C_1$-$C_6$ aliphatic or aromatic radical; $R^4$ is independently at each occurrence a $C_1$-$C_{18}$ aliphatic or aromatic radical or $R^5$, wherein $R^5$ comprises structure (II):

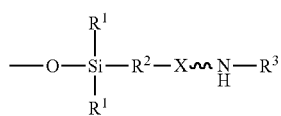

wherein X is independently at each occurrence an oxygen atom or a sulfur atom; w is between 0 and 5; y is between 0 and 10; and z is between 0 and 10; wherein, when $R^4$ is $R^5$ comprising the structure (II), a sum of w, y, and z is greater than or equal to 0, and, when $R^4$ is not $R^5$, a sum of w, y, and z is greater than or equal to 1; and wherein the amino-siloxane comprises structure (Ic):

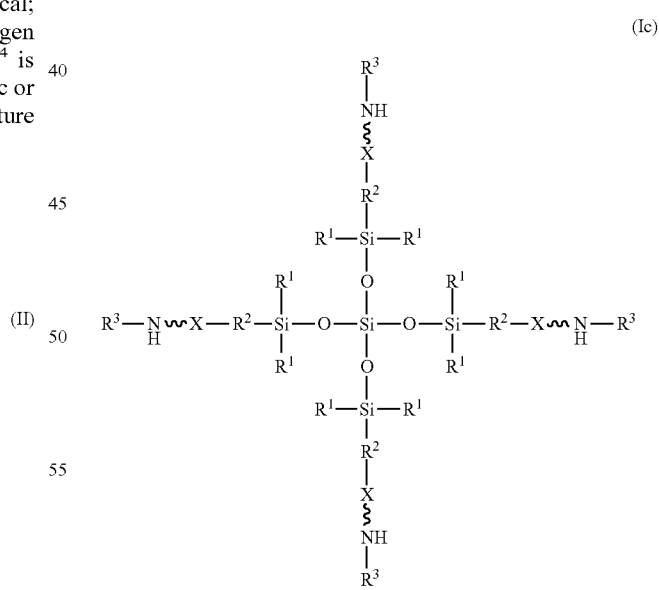

wherein $R^1$ is independently at each occurrence a $C_1$-$C_6$ aliphatic or aromatic radical; $R^2$ is independently at each occurrence a $C_2$-$C_{10}$ aliphatic or aromatic radical; $R^3$ is independently at each occurrence a hydrogen atom or a $C_1$-$C_6$ aliphatic or aromatic radical; and X is independently at each occurrence an oxygen atom or a sulfur atom.

5. An absorbent composition comprising an amino-siloxane having structure (I):

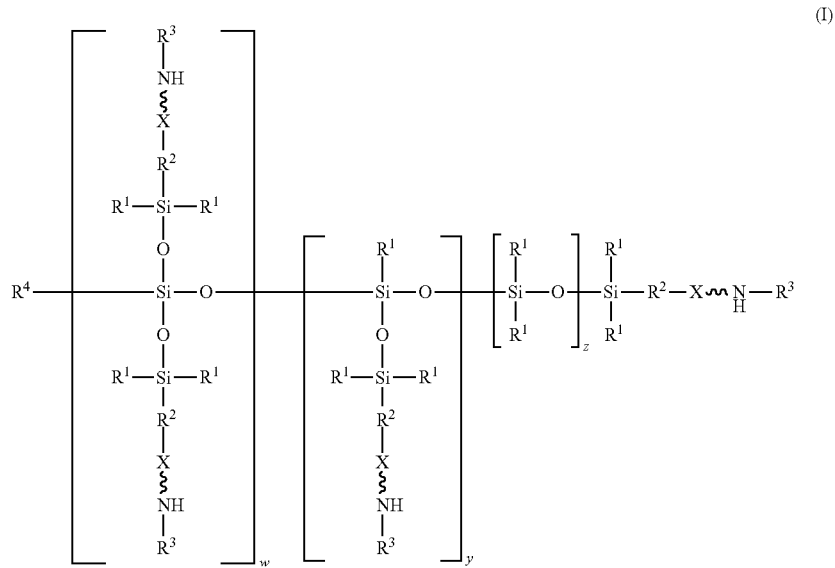

wherein $R^1$ is independently at each occurrence a $C_1$-$C_6$ aliphatic or aromatic radical; $R^2$ is independently at each occurrence a $C_2$-$C_{10}$ aliphatic or aromatic radical; $R^3$ is independently at each occurrence a hydrogen atom or a $C_1$-$C_6$ aliphatic or aromatic radical; $R^4$ is independently at each occurrence a $C_1$-$C_{18}$ aliphatic or aromatic radical or $R^5$, wherein $R^5$ comprises structure (II):

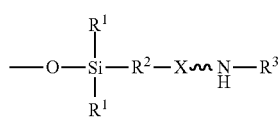

wherein X is independently at each occurrence an oxygen atom or a sulfur atom; w is between 0 and 5; y is between 0 and 10; and z is between 0 and 10; wherein, when $R^4$ is $R^5$ comprising the structure (II), a sum of w, y, and z is greater than or equal to 0, and, when $R^4$ is not $R^5$, a sum of w, y, and z is greater than or equal to 1; and wherein the amino-siloxane comprises structure (Id):

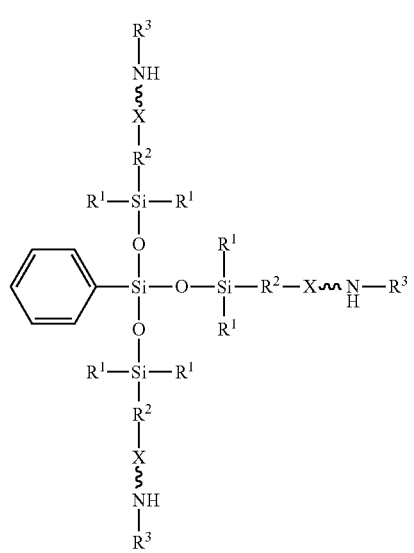

wherein $R^1$ is independently at each occurrence a $C_1$-$C_6$ aliphatic or aromatic radical; $R^2$ is independently at each occurrence a $C_2$-$C_{10}$ aliphatic or aromatic radical; $R^3$ is independently at each occurrence a hydrogen atom or a $C_1$-$C_6$ aliphatic or aromatic radical; and X is independently at each occurrence an oxygen atom or a sulfur atom.

6. The absorbent composition of claim 4, wherein the absorbent composition is substantially free of a carrier fluid with the amino-siloxane.

7. The absorbent composition of claim 5, wherein the absorbent composition is substantially free of a carrier fluid with the amino-siloxane.

8. The absorbent composition of claim 4, wherein the amino-siloxane is configured to form a reaction product with carbon dioxide, the reaction product being substantially liquid at temperatures between about 20 degrees Celsius and about 50 degrees Celsius.

9. The absorbent composition of claim 5, wherein the amino-siloxane is configured to form a reaction product with carbon dioxide, the reaction product being substantially liquid at temperatures between about 20 degrees Celsius and about 50 degrees Celsius.

* * * * *